H. T. RECTOR.
Plow-Clearer.

No. 205,574. Patented July 2, 1878.

WITNESSES:
Henry N. Miller
C. Sedgwick

INVENTOR:
H. T. Rector
BY
ATTORNEYS.

UNITED STATES PATENT OFFICE.

HOMER T. RECTOR, OF CLINTON, (CADY P. O.,) MICHIGAN.

IMPROVEMENT IN PLOW-CLEARERS.

Specification forming part of Letters Patent No. 205,574, dated July 2, 1878; application filed May 4, 1878.

*To all whom it may concern:*

Figure 1:
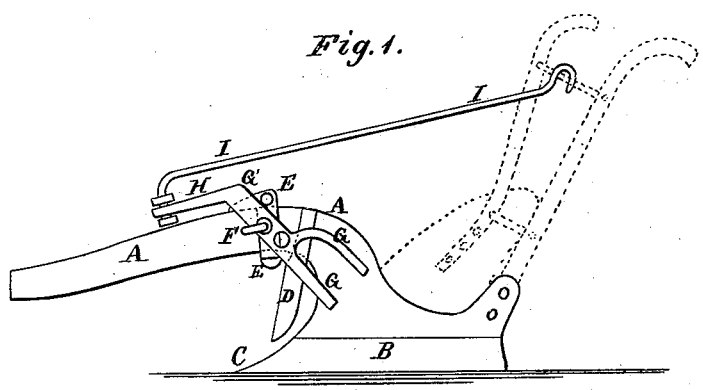
Figure 2:
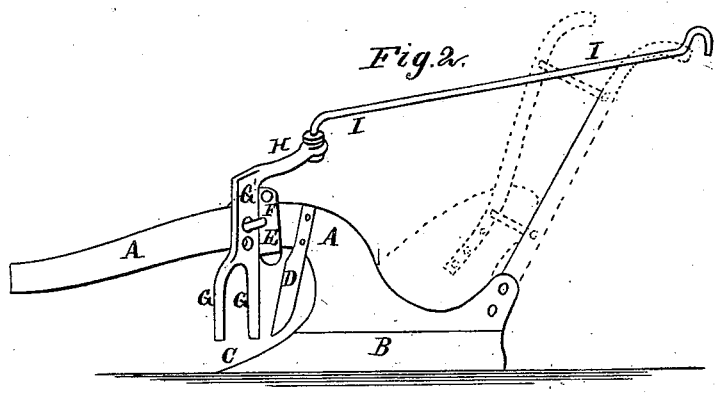

Be it known that I, HOMER T. RECTOR, of Clinton, (Cady P. O.,) county of Macomb, and State of Michigan, have invented a new and Improved Plow-Clearer, of which the following is a specification:

Figure 1 is a side view of my improved device, shown in position for carriage and for beginning its work. Fig. 2 is a side view of the same, shown as having completed its forward movement.

Similar letters of reference indicate corresponding parts.

The object of this invention is to furnish an improved attachment for plows for use in keeping them clear of stubble, stalks, weeds, grass, and other rubbish, without having to stop the team to clear the plows of the said rubbish.

A represents the beam, B the land-side, C the point, and D the cutter, of a plow, about the construction of which parts there is nothing new. To the beam A is secured a clip, E, to which is attached a hook, staple, or eye, F. The hook, staple, or eye F passes through a hole in the bar G, and thus pivots the said bar to the plow-beam. Several holes are formed in the bar G to receive the hook, staple, or eye F, and enable the said bar G to be adjusted according to the depth at which the plow works in the ground. The lower end of the bar G is forked, and upon its upper end is formed, or to it is attached, an inclined arm, H, to the outer end of which is pivoted the end of a rod, I. The rod I has a hook formed upon its free end, and is made of such a length as to extend back to and hook upon the upper round of the plow-handles when the forked bar G has been turned back against the rear part of the beam A. With this construction, when rubbish begins to collect in the throat of the plow, by unhooking the rod I and drawing it back the lower forked end of the bar G will be swung outward and forward, pushing the rubbish off the plow in such a direction that it will fall into the furrow and upon the furrow-slice, so as to be covered by the furrow-slice when it is turned. This device enables the plow to be cleared of rubbish without stopping the team.

The use of forked clearers operated by the plowman is not broadly new; but

What I claim is—

The combination, with the plow-beam, of clip E, hook-staple F, the forked bar G, provided with crank-arm H, arranged to make a half-revolution when swung forward, and the rod I, having hook at its rear end, as and for the purpose specified.

HOMER T. RECTOR.

Witnesses:
 GEORGE H. CROCKER,
 JAMES G. TUCKER,
 W. H. RUTTER.